(12) United States Patent
Todescato

(10) Patent No.: US 9,489,556 B2
(45) Date of Patent: Nov. 8, 2016

(54) SCANNER NOTIFICATIONS

(71) Applicant: DATALOGIC ADC, INC, Eugene, OR (US)

(72) Inventor: Pietro Todescato, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/836,569

(22) Filed: Aug. 26, 2015

(65) Prior Publication Data

US 2016/0063292 A1 Mar. 3, 2016

Related U.S. Application Data

(60) Provisional application No. 62/042,015, filed on Aug. 26, 2014.

(51) Int. Cl.
*G06K 7/10* (2006.01)
*G06K 15/00* (2006.01)
*G08B 13/24* (2006.01)

(52) U.S. Cl.
CPC ......... *G06K 7/10821* (2013.01); *G08B 13/246* (2013.01)

(58) Field of Classification Search
CPC .......... G06K 7/10; G06K 15/00; G06K 7/00; G06K 19/00; G06F 19/00; G06F 17/00; G06Q 30/00; G06Q 90/00
USPC ........... 235/462.13, 436, 375, 383, 385, 487
See application file for complete search history.

(56) References Cited

U.S. PATENT DOCUMENTS

| | | | |
|---|---|---|---|
| 2003/0197611 A1* | 10/2003 | Clifford et al. | 340/572.1 |
| 2004/0113791 A1* | 6/2004 | Salim et al. | 340/572.3 |
| 2011/0147454 A1* | 6/2011 | Matsuhisa et al. | 235/383 |
| 2013/0278425 A1* | 10/2013 | Cunningham et al. | 340/572.1 |
| 2014/0085089 A1* | 3/2014 | Rasband et al. | 340/572.1 |

* cited by examiner

*Primary Examiner* — Edwyn Labaze
(74) *Attorney, Agent, or Firm* — Shook, Hardy & Bacon L.L.P.

(57) ABSTRACT

A scanner notification indicates an operational status of the scanner, such as a hand-held scanner used at a point-of-sale or as part of an inventory-tracking system. Among other things, a notification might indicate to a user that a product identifier has been verified, product tracking is occurring, a tag is being deactivated, successful completion of scanning functions, and various other operational states of the scanner.

20 Claims, 4 Drawing Sheets

SCANNER NOTIFICATIONS

BACKGROUND

Scanners (e.g., hand-held or stationary) are often used at a point-of-service (POS) or when managing inventory in order to exchange information related to an item of interest (e.g., product at the point of sale). For instance, scanners can be used to read bar codes, to deactivate security tags, and exchange information with tracking devices. Sometimes a scanner output device is provided to assist with operating the scanner. Examples of output devices include a digital display, speaker, LED indicator, tactile device, and the like.

SUMMARY

An embodiment of the present invention is directed to providing a scanner notification indicating an operational status of the scanner. For example, a notification might indicate to a user that a product identifier has been verified, product tracking is occurring, a tag is being deactivated, successful completion of scanning functions, and various other operational states of the scanner.

Embodiments of the invention are defined by the claims below, not this summary. A high-level overview of various aspects of the invention is provided to introduce a selection of concepts, which are further described in the detailed-description section below. This summary is not intended to identify key features or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

At a high level, an embodiment of the present invention is directed to providing scanner notifications, which convey a status of scanning operations. For example, a scanner (e.g., hand-held or stationary) might be used in a point-of-service context to interact with bar codes, security devices, and tracking devices affixed to products being purchased. Among other types of notifications, the scanner might provide a notification that a bar code has been read and verified. In addition, a notification might indicate that the product includes a security device (e.g., EAS tag), that the security device is being deactivated, and/or that the security device has been successfully deactivated and that the scanning operations were successful. In another embodiment, a notification indicates that a tracking device is being read and/or updated. In one embodiment, a scanner is used to execute a progression of operations, and a series of notifications is provided to indicate which particular operation is being performed at an instant in time. For example, a series of notifications might be provided to indicate that a particular item includes a security tag and that the scanner is executing a tag-deactivation process.

Figure 1:
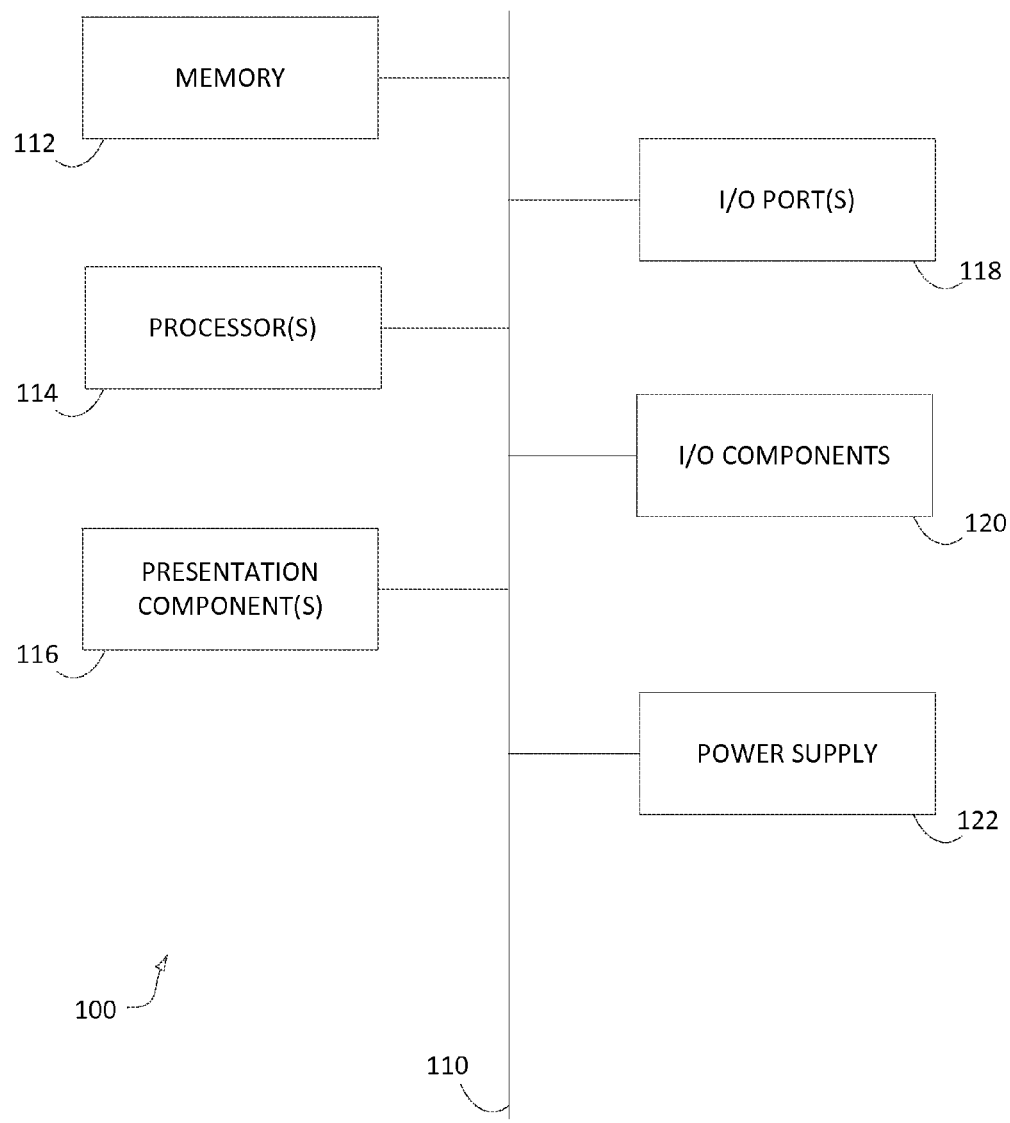
FIG. 1 depicts an exemplary computing device in accordance with an embodiment of the present invention.

Having described various embodiments of the present invention, now described is a general computing device 100 in the context of FIG. 1. That is, one or more embodiments of the present invention might be directed to a system that is implemented using one or more computing devices, such as the computing device 100 depicted in FIG. 1. In addition, one or more embodiments might include a computer readable medium storing computer-executable instructions that, when executed by a computing device 100, perform a method of providing scanner notifications. Thus, aspects of the present invention might be embodied in various forms, such as a computing device, a component of a computing device, a method, a computer-storage media or device that stores instructions, and the like.

In FIG. 1 an exemplary computing environment for implementing embodiments of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, hand-held scanners, stationary scanners (e.g., counter mounted), consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, radio 117, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EEPROM; flash memory or other memory technology; CD-ROM; digital versatile disks (DVD) or other optical disk storage; magnetic cassettes, magnetic tape, magnetic disk storage or other magnetic storage devices; or other mediums or computer storage devices which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, diode, speaker, printing component, vibrating component, etc.

Radio 117 functions to send and receive signals from a network, such as a telecommunications network. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
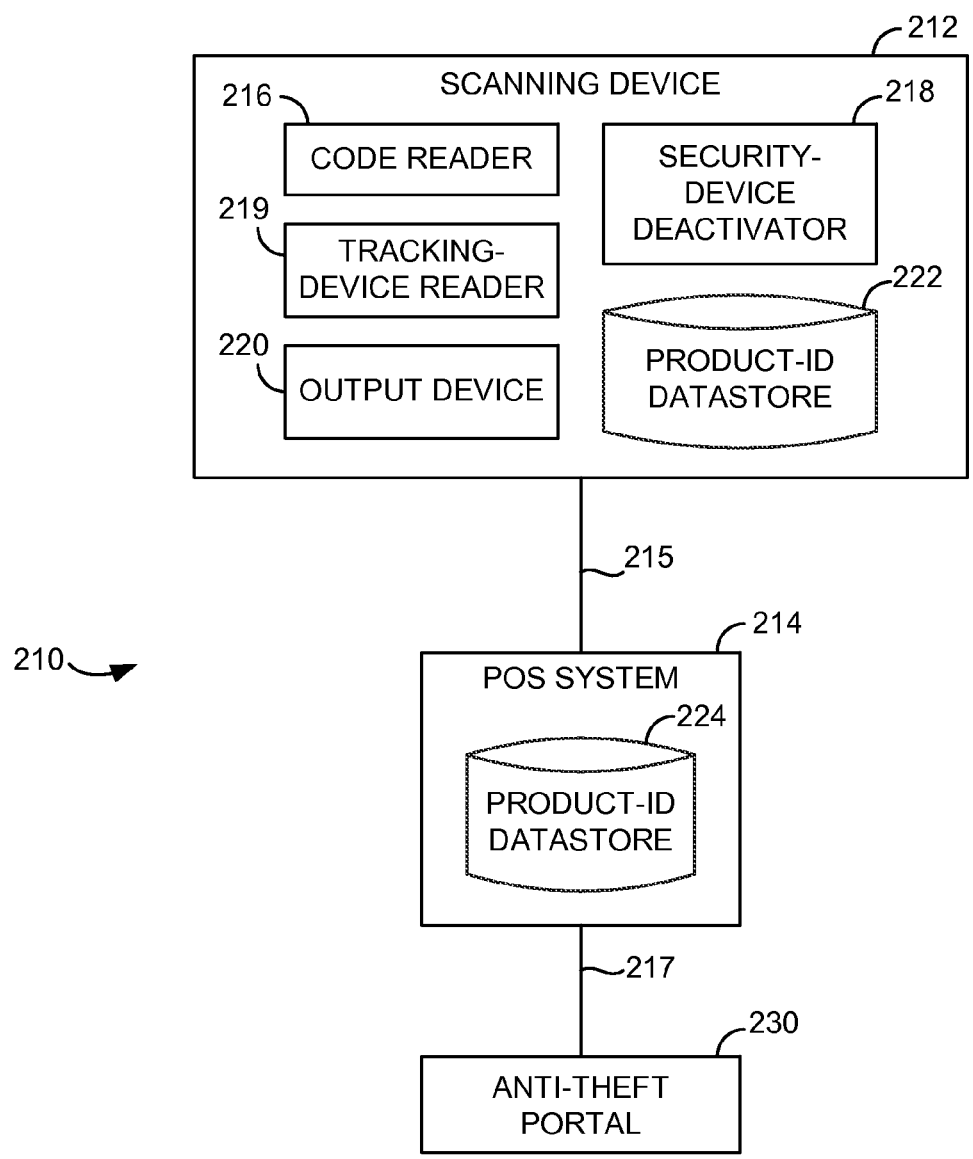
FIG. 2 depicts a system of components in accordance with an embodiment of the present invention.

Referring now to FIG. 2, a system of networked components is depicted that are usable to provide scanner notifications. The system 210 includes a scanning device 212, a point-of-service (POS) system 214, and an anti-theft portal 230. The components 212, 214, and 230 might communicate with one another via one or more connections 215 and 217, such as a wired connection and/or a wireless connection. For example, the scanning device 212 might receive a product identifier when a product code (e.g., bar code) is scanned and communicate with the POS system 214 via the connection 215 to exchange information relevant to a product. Once a product has been purchased, the POS system 214 might communicate with the anti-theft portal 230 to notify the portal 230 that a particular product is sold. Each of the scanner 212, POS system 214, and anti-theft portal 230 might include a respective computing device having some or all of the components described with respect to FIG. 1.

FIG. 2 also illustratively depicts that the scanning device 212 and the POS system 214 include various components that are not explicitly described with respect to FIG. 1. For example, the scanning device 212 includes a code reader 216, a security-device deactivator 218, a tracking-device reader 219, an output device 220, and a product-identifier datastore 222 stored in a memory of the scanning device 212. In addition, the POS system 214 might include another product-identifier datastore 224, which might include similar information as stored in the product-identifier datastore 222 of the scanner 212. Although FIG. 2 depicts that both the scanning device 212 and the POS system 214 include respective lookup tables, it might be the case that only a single lookup table is stored in the system 210.

The code reader 216 might perform various functions, and in one aspect, the code reader 216 scans a bar code to determine a product identifier. The code reader 216 includes various elements, such as a light source and optics components that function to read the bar code.

The product-identifier datastores 222 and 224 store a listing of unique product identifiers, as well as information related to a particular product identifier. The information might be stored in various searchable formats, such as in a lookup table that associates relevant information with each unique product identifier. Examples of the types of information that might be stored include an indication of whether a product includes a security device (e.g., EAS tag or label) and/or whether a product includes a tracking device (e.g., RFID tag). Again, the information might be stored in the memory of each scanner 212. In addition (or alternatively), the information might be stored in a central datastore of the POS system.

The security-device deactivator 218 functions to deactivate a security tag or label that is attached to a product, such as an EAS tag or label. The security-device deactivator 218 might function in various ways to deactivate the security device, such as actively warming the tag.

The tracking-device reader 219 exchanges information between a tracking tag (e.g., RFID tag) on the product and a tracking system, which can provide various tasks, such as inventory control. For example, the tracking-device reader 219 can read information contained in a tracking tag, and communicate it to other systems, such as the POS system, a tracking system, and/or the anti-theft portal. In addition, the tracking-device reader 219 might issue an order to modify some or all of the content of the tracking tag, which can deter end-user tracking.

The scanner further includes an output device 220, similar to the presentation component 116 of FIG. 1. The output device 220 functions to report or present indications conveying an operating status of the scanner. Exemplary output devices include a digital display, a speaker providing an audible beep, an LED indicator, a vibrating component or other tactile-feedback mechanism, a light-beam emitter, and the like. In an embodiment, the output device 220 presents a series of notifications indicating a status of a particular operation, such as pending, successfully completed, or failed.

In a further embodiment, the notifications that are provided by the output device 220 might be presented in various manners. For example, a notification might include be audible (e.g., beep), visual (e.g., colored light), tactile (e.g., vibrate), or a combination thereof. Colored-light notifications can include various styles such as an LED or a light-beam emission directed onto a scanned surface.

The output might be manipulated in various manners to convey different notifications. For instance, a light output might include a constant emission to convey one type of notification and a flashing emission to convey a different notification. In addition, a color notification might change from one color to another color to represent a change in status of the scanner. For instance, a constantly emitted green light might convey a successful completion of scanner operations, whereas a yellow or red light might convey a failure in operations. In another aspect, a blinking green light conveys that that scanner is successfully working through a pending operation, but has not yet completed the operation. These are merely examples of output types, and various other outputs might be used to provide notifications of scanner operations.

Figure 3:
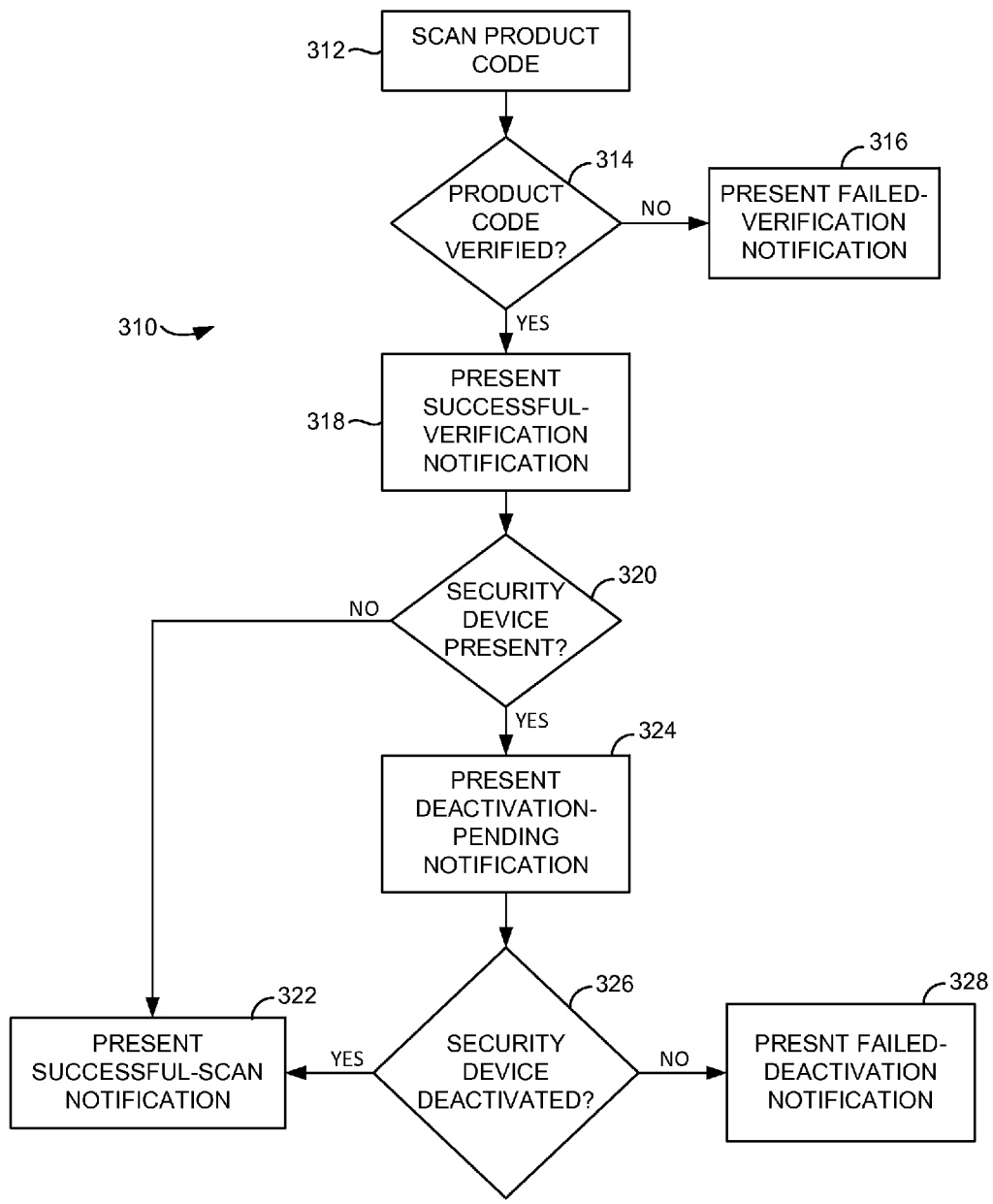
FIGS. 3 and 4 depict respective flow diagrams, each illustrating steps that are carried out in accordance with some embodiments of the present invention.

Referring now to FIG. 3, a flow diagram depicts a series of steps or operations 310 that are carried out in accordance with an embodiment of the present invention. In one embodiment, the steps 310 are included in a method of presenting scanner notifications. In another embodiment, the steps 310 are stored as computer-executable instructions on a computer-readable medium. In a further embodiment, the steps 310 are carried out by a computing device or as part of a system.

The steps 310 include scanning 312 a product code. For example, the code reader 216 of the scanner 212 reads a bar code, and a unique product identifier is received by the scanner. Step 314 includes determining whether the product identifier is verified. For example, a product-identifier datastore (222 and/or 224) might be referenced to search for the product identifier. Based on the datastore, a determination can be made as to whether the product identifier exists and is active.

If the product identifier is not verified, then step 316 includes presenting a failed-verification notification. For example, the output device 219 might emit a colored-notification having a certain color (e.g., red) or a logo (e.g., x-out) or an audible beep that indicates to the user that the product identifier was not verified.

At step 318, if the product identifier is verified, then a successful-verification notification is presented. For example, the output device might emit a colored-notification having a color indicating that the product identifier was verified. However, product-identifier verification might not represent the only operation performed by the scanner, such that a series of notifications are provided in addition to, or near simultaneously with, the successful-verification notification.

At step 320, a determination is made as to whether the product includes a security device, which is to be deactivated. For instance, the datastore 222 or 224 might store information associated with the product identifier that indicates whether the product includes a security device to be deactivated. Thus, the determination can be made by searching or referencing the datastore. In one embodiment, the determination is made when the product identifier is verified. If the product doesn't include a security device to be activated, then at step 322 a successful-scan notification is presented. For example, a constantly emitted light beam having a particular color or logo might be directed onto a scanned surface.

At step 324, if it has been determined that the product does include a security device to be deactivated, then a set of deactivation-notification operations are initiated by presenting a deactivation-pending notification. For example, if a colored light (e.g., green) is emitted to convey that a product identifier has been verified, then the colored light might be caused to flash or blink while the deactivation process is being carried out to convey to a user that the deactivation is pending. As indicated with respect to step 318, notifications might be combined into a single output conveying multiple operational statuses. For instance, a colored-light notification might include a particular color (e.g., green) to indicate one status (e.g., verified product identifier) and might be flashing to indicate another status (e.g., deactivation pending).

Step 326 is also included within the set of deactivation-notification operations and includes determining whether the security device has been deactivated. If the security device has been deactivated, then a successful-scan notification is presented at step 322. For example, if the deactivation-pending notification included a blinking light notification, then the successful-scan notification might include a constantly emitted light notification. In one embodiment, determining whether the security device has been deactivated includes trying to scan the security device after an initial reading to determine whether the security device is still active.

In contrast, if the security device has not been successfully deactivated, then a failed-deactivation notification is presented at step 328. For instance, if the successful-verification notification included a colored-light notification, then the failed-deactivation notification might modify the color, include an audible beep, provide a tactile feedback, or a combination thereof. In one instance, presentation of either the successful-deactivation notification or the failed-deactivation notification concludes the deactivation-notification operations.

Figure 4:
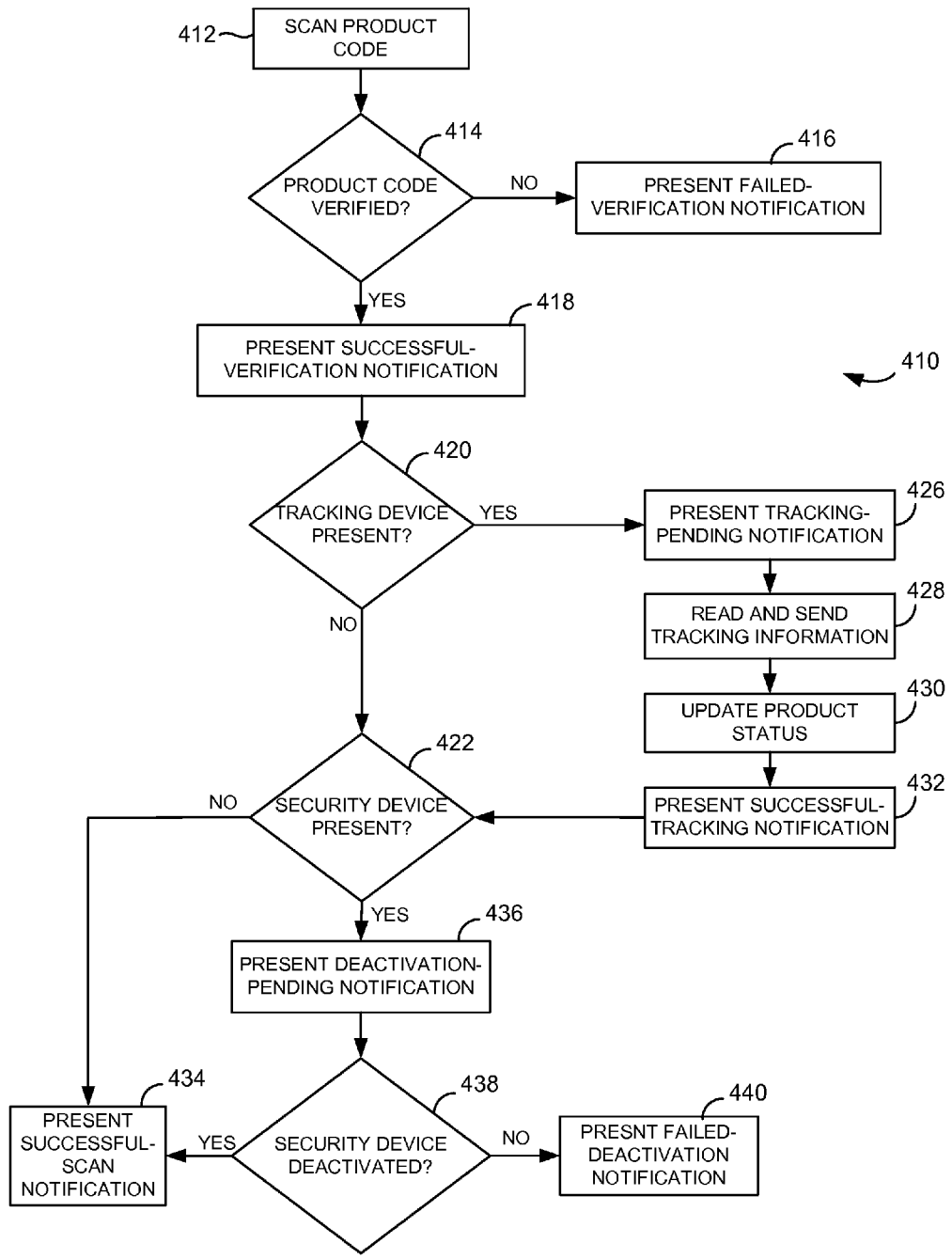

Referring now to FIG. 4, another flow chart is depicted that illustrates another series of steps 410, which are carried out in accordance with an embodiment of the present invention. In one embodiment, the steps 410 are included in a method of presenting scanner notifications. In another embodiment, the steps 410 are stored as computer-executable instructions on a computer-readable medium. In a further embodiment, the steps 410 are carried out by a computing device or as part of a system.

The steps 410 include scanning 412 a product code. For example, the code reader 216 of the scanner 212 reads a bar code, and a unique product identifier is received by the scanner. Step 414 (similar to step 314) includes determining whether the product identifier is verified. For example, a product-identifier datastore (222 and/or 224) might be referenced to search for the product identifier. Based on the datastore, a determination can be made as to whether the product identifier exists and is active.

If the product identifier is not verified, then step 416 (similar to step 316) includes presenting a failed-verification notification. For example, the output device 219 might emit a colored-notification having a certain color (e.g., red) or a logo (e.g., x-out) or an audible beep that indicates to the user that the product identifier was not verified.

At step 418, if the product identifier is verified, then a successful-verification notification is presented. For example, the output device might emit a colored-notification having a color indicating that the product-identifier was verified. However, product-identifier verification might not represent the only operation performed by the scanner, such that a series of notifications are provided in addition to, or near simultaneously with, the successful-verification notification.

At step 420, a determination is made as to whether the product includes a tracking device (e.g., RFID tag) to be updated. For instance, the datastore 222 or 224 might store information associated with the product identifier that indicates whether the product includes a tracking device. Thus, the determination can be made by searching or referencing the datastore. In one embodiment, the determination is made when the product identifier is verified and/or when a determination is made as to whether the product includes a security device (e.g., step 320). If the product doesn't include a tracking device, then at step 422 a determination is made as to whether the product includes a security device, such as by looking up the product identifier in the datastore.

At step 424, if it has been determined that the product does include a tracking device, then a set of tracking-update operations are initiated by presenting a tracking-pending notification at step 426. For example, as previously described, if a colored light (e.g., green) is emitted to convey that a product identifier has been verified, then the colored light might be caused to flash or blink at a first frequency while the tracking process is being carried out to convey to a user that the tracking operations are pending. As previously described, notifications might be combined into a single output conveying multiple operational statuses. For instance, a colored-light notification might include a particular color (e.g., green) to indicate one status (e.g., verified product identifier) and might be flashing to indicate another status (e.g., tracking pending).

Step 428 includes reading and sending tracking information. For example, information contained in a tracking tag can be read from the tag by the tracking-device reader 219 and might be communicated to the POS system or the anti-theft controller. The information contained in the tracking tag can be used to update 430 a status of the product in one or more systems (e.g., POS and/or anti-theft).

Once the tracking operations are completed, then step 432 includes presenting a successful tracking notification, and a determination is made 422 as to whether a security device is present. If no security device is present, then a successful-scan notification is presented at step 434. For example, a constantly emitted light beam having a particular color or logo might be directed onto a scanned surface.

If it has been determined that the product does include a security device to be deactivated, then a set of deactivation-notification operations are initiated by presenting a deactivation-pending notification at step 436. The set of deactivation-notification operations include steps 436, 438 and 434 or 440, and are similar to the deactivation-notification operations described with respect to FIG. 3. For example, a deactivation-pending notification might include various types of outputs provided by the output device 222. One exemplary deactivation-pending notification includes a blinking colored-light notification that flashes at a frequency different than the tracking-pending notification in step 426. However, the tracking-pending notification might be modified in various manners to indicate that the tracking was successfully completed and that the operations have proceeded into the deactivation-notification operations.

In one embodiment, a step of modifying the tracking-pending notification (presented in step 426) conveys one or more operational statuses, such as the successful-tracking notification and the transition of the scanner to either a successful-scan status or to the deactivation-notification operations. For example, the tracking-pending notification might include a blinking colored-light notification that could be modified in various manners to indicate a subsequent status of the scanner. One modification includes changing the blinking condition to a non-blinking state to provide a successful-tracking notification, to indicate that no security device is present, and to provide a successful-scan notification. In that instance, the mere modification of the blinking state to a non-blinking state conveys multiple operational statuses. Other outputs might be combined with the modification, such as an audible beep or chirp, or a tactile feedback. Another modification of the tracking-pending notification includes changing a frequency with which with colored-notification blinks to provide the deactivation-pending notification. That is, the modification of the blinking colored-notification from a first blinking frequency (conveying the tracking-pending notification) to a second blinking frequency (conveying the deactivation-pending notification) also provides the successful-tracking notification. Other modifications might also be made to the tracking-pending notification such as modifying a color of a colored-light notification.

In another embodiment, a single tag or device that is attached to an item or product of interest might provide both an inventory-control functionality and an anti-theft mechanism. Accordingly, the barcode might read to obtain a product identifier, which is verified using the datastore 222 or 224. At that point, an operations-pending notification might be provided, such as by a flashing colored-light notification, which also conveys that the product identifier was verified. The tracking operations might include transmitting the tracking information included in the tag to the anti-theft portal, which updates a status of the product (e.g., marked as "sold"). The scanner then modifies at least part of the tag to avoid end-user tracking or simply close the transaction. The anti-theft portal at the exit door can detect the tag when the product passes through the portal, at which time the product identifier is transmitted to the security system. Because the status was already updated, the system can verify that the item has been purchased and communicate with the anti-theft system to not present an alarm.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Computer storage media storing computer-executable instructions that, when executed by a computing device, perform operations for presenting tag-scanner notifications comprising: receiving a product identifier obtained by a scan of a product code; determining that the product identifier is verified by looking the product identifier up in a product-identifier datastore; presenting a verified-product notification indicating that the product identifier is verified; determining that the product identifier is associated with a product-tracking device by searching information associated with the product identifier; executing tracking-update operations comprising: presenting a tracking-pending notification; wirelessly reading tracking information that is stored by the product-tracking device and that is sent to a tracking controller; and updating a status of the product to reflect the tracking information; determining whether the product identifier is associated with a security device by searching information associated with the product identifier; if the security device is not associated with the product identifier, presenting a successful-scan notification; and if the security device is associated with the product identifier executing operations comprising: presenting a deactivation-pending notification; determining whether the security device is successfully deactivated; if the security device is successfully deactivated, presenting the successful-scan notification, and if the security device is not successfully deactivated, presenting a failed-deactivation notification.

2. The computer storage media of claim 1, wherein presenting the verified-product notification includes emitting a colored-light notification.

3. The computer storage media of claim 2, wherein emitting the colored-light notification includes emitting a light beam onto a scanned surface.

4. The computer storage media of claim 2, wherein emitting the colored-light notification includes illuminating a light-emitting diode.

5. The computer storage media of claim 2, wherein the verified-product notification is represented by a color of the colored-light notification, and wherein presenting the deactivation-pending notification includes causing the colored-light notification to blink by intermittently emitting a colored light.

6. The computer storage media of claim 5, wherein presenting the successful-scan notification includes modifying the presentation of the colored-light notification from a blinking state to a constantly-emitted state.

7. The computer storage media of claim 5, wherein presenting the failed-deactivation notification includes changing the colored-light notification from a first color to a second color.

8. The computer storage media of claim 1, wherein determining whether the security device is successfully deactivated includes reading the security device at a first instant in time, executing a deactivation process after the security device is read at the first instant in time, and attempting to read the security device at a subsequent instant in time, and wherein the successful-scan notification is presented when the security device is read during the first instant in time and is not readable at the second instant in time.

9. The computer storage media of claim 1, wherein presenting the verified-product notification includes presenting a colored-light notification having a first color and wherein presenting the successful-scan notification includes presenting another colored-light notification having a second color.

10. Computer storage media storing computer-executable instructions that, when executed by a computing device, perform operations for presenting tag-scanner notifications comprising:
receiving a product identifier obtained by a scan of a product code;
determining that the product identifier is verified by looking the product identifier up in a product-identifier datastore;
presenting a verified-product notification indicating that the product identifier is verified;
determining that the product identifier is associated with a product-tracking device by searching information associated with the product identifier;
executing tracking-update operations comprising:
presenting a tracking-pending notification;
wirelessly reading tracking information that is stored by the product-tracking device and that is sent to a tracking controller; and
updating a status of the product to reflect the tracking information;
determining that the product identifier is associated with a security device by searching information associated with the product identifier; and
executing deactivation-notification operations comprising:
presenting a deactivation-pending notification;
determining that the security device is successfully deactivated; and
presenting a successful-scan notification.

11. The computer storage media of claim 10, wherein presenting the verified-product notification includes emitting a colored-light notification.

12. The computer storage media of claim 11, wherein the verified-product notification is represented by a color of the colored-light notification, and wherein presenting the deactivation-pending notification includes causing the colored-light notification to blink by intermittently emitting a colored light.

13. The computer storage media of claim 12, wherein presenting the deactivation-pending notification includes modifying a frequency with which the colored-light notification is intermittently emitted.

14. The computer storage media of claim 12, wherein presenting the deactivation-pending notification includes changing the colored-light notification from a first color to a second color.

15. The computer storage media of claim 12, wherein presenting a successful-scan notification includes modifying the colored-light notification from a blinking status, which indicates the deactivation process is being executed, to a non-blinking status indicating that the deactivation process was successfully executed.

16. A scanning device that presents scanner notifications conveying a status of scanning operations, the scanning device comprising: a barcode reader; a tracking-device reader: a security-device deactivator; an output device; and one or more processors that are coupled to the barcode reader, the security-device deactivator, and the output device, and that are coupled to a computer-readable medium, which stores instructions executable by the processor including: receiving a product identifier from the barcode reader; verifying the product identifier; determining that the product identifier is associated with a product-tracking device; instructing the output device to present a tracking-device notification conveying a status of the tracking-device reader; determining that the product identifier is associated with a security device; instructing the output device to present a successful-verification notification and a deactivation-pending notification; determining that the security device is deactivated; and instructing the output device to present a successful-scan notification.

17. The scanning device of claim 16, wherein the product identifier is verified by searching a product-identifier datastore, which is also searched to determine that the product identifier is associated with the security device.

18. The scanning device of claim 17 further comprising the product-identifier datastore.

19. The device of claim 16, wherein the output device includes a light-beam emitter, which directs a beam of light onto a target object.

20. The device of claim 16 further comprising, a tracking-device reader, wherein the processor instructs the output device to present a tracking-device notification conveying a status of the tracking-device reader.

* * * * *